July 1, 1958  S. S. NORDBLAD  2,841,514
DEVICE FOR CONTROLLING AND ADJUSTING THE CAPACITANCE
OF AN ELECTRICALLY INSULATED CONDUCTOR
Filed June 1, 1956  3 Sheets-Sheet 1

INVENTOR
SVEN SIGURD NORDBLAD

By Hane and Hydick
ATTORNEYS

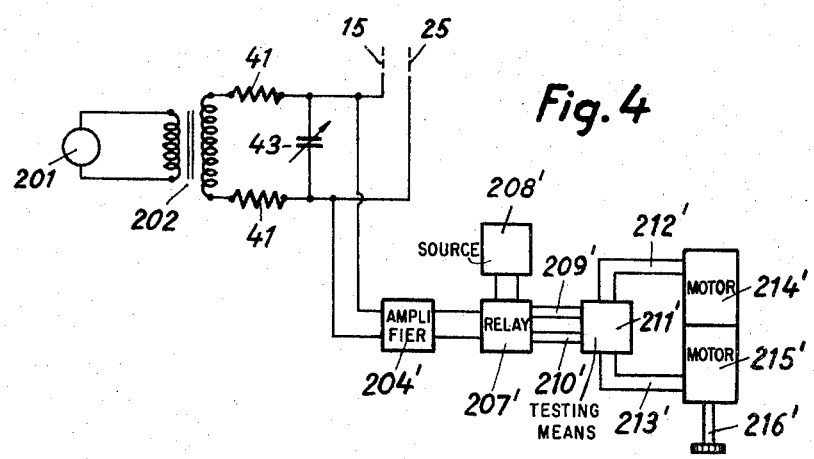
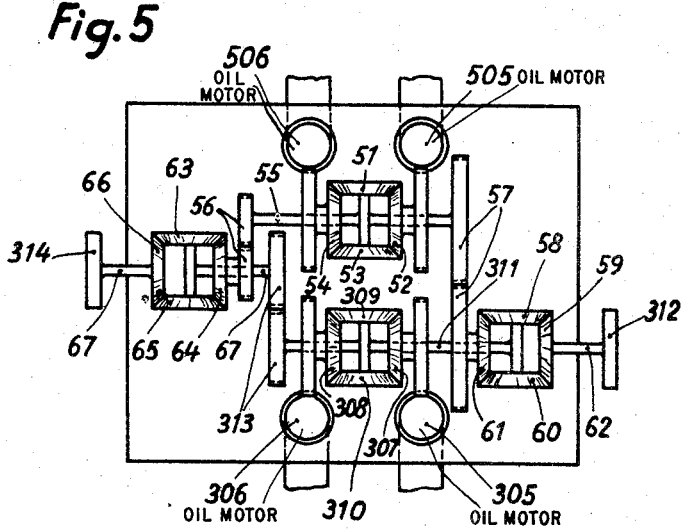

# United States Patent Office 2,841,514
Patented July 1, 1958

2,841,514

DEVICE FOR CONTROLLING AND ADJUSTING THE CAPACITANCE OF AN ELECTRICALLY INSULATED CONDUCTOR

Sven Sigurd Nordblad, Spanga, Sweden, assignor to Telefonaktiebolaget L M Ericsson, Stockholm, Sweden, a corporation of Sweden Application June 1, 1956, Serial No. 588,642

Claims priority, application Sweden June 13, 1955

7 Claims. (Cl. 154—2.24)

The present invention refers to a device for controlling and adjusting the capacitance of an electrically insulated conductor, on which a material is spirally applied. A device according to the invention is characterized by a rotatable supply means arranged so as to be able to rotate round a shaft with the same direction as the direction, which an electrically insulated conductor coming from the supply means has when leaving the said supply means, the invention being furthermore characterized by a measuring means, which the electrically insulated conductor coming from the supply means has to pass for control of its capacitance, the rotatable supply means being arranged to rotate in dependence on the control results from said measuring means.

Figure 1:
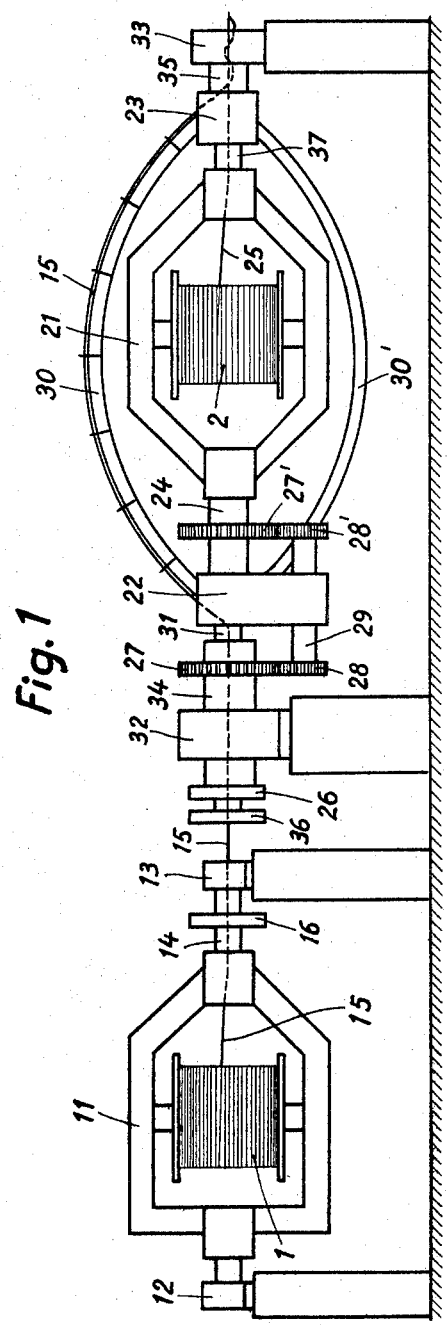
Figure 2:
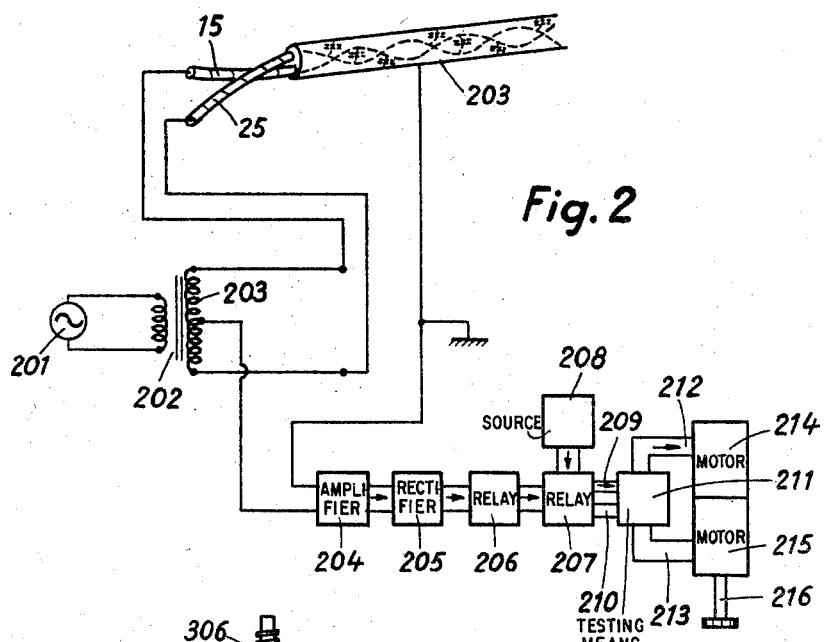
Figure 3:
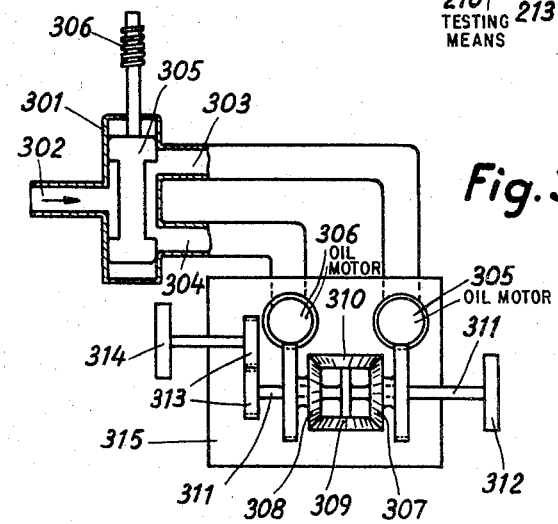

The invention will be more closely described in connection with the attached drawings, where Fig. 1 schematically shows a device for pairtwining in accordance with the principle of the invention, Fig. 2 shows a block-diagram of a measuring means for control of the possible difference of the capacitance between conductor and earth for two conductors in an electrically insulated line, Fig. 3 shows a device for driving two supply means comprised in the device according to Fig. 1 in dependence on the control-results from the measuring means according to Fig. 2, Fig. 4 is a block-diagram of a measuring means for control of the magnitude of the capacitance between two conductors in an electrically insulated line, and Fig. 5 shows a modification of the device according to Fig. 3 for driving the two supply means in dependence on the control results as well from the measuring means according to Fig. 2 as from the measuring means according to Fig. 4.

Fig. 1 schematically shows the mechanical structure of a device for pairtwining of cables according to the invention. The electrically insulated conductors 15 and 25 comprised in a line are fed from two supply reels 1 and 2, each of which is rotatably arranged in a cradle 11, respectively 21. An insulating material, for example paper-band, is spirally applied to the conductors 15 and 25. The cradle 11 is mounted at 12 and 13, and is provided with a hollow shaft 14, through which the wire 15 from the reel 1 is drawn and on which a pulley 16 is arranged for transmitting a rotary movement to the cradle 11, which thus is arranged to rotate round a shaft with the same direction as the direction which the electrically insulated conductor 15 coming from the supply-reel 1 has when leaving the shaft 14. The supply-reel 1 is mounted in the cradle 11, so that the wire 15 can be unwound from the reel. The cradle 21 is mounted in a house 22 and at 23, and provided with a hollow shaft 37 through which the conductor 25 is drawn, and with a shaft 24 on which a cog-wheel 27' is fastened. In the house 22 is mounted a through-going shaft 29, at the ends of which cog-wheels 28 and 28' are fastened. The cog-wheel 28' is in mesh with the cog-wheel 27', and the cog-wheel 28 with a cog-wheel 27, which is fastened to a hollow shaft 34. Furthermore, there protrudes a hollow shaft 31 from the house 22, said shaft being mounted inside the shaft 34 and supporting at its end a pulley 36 for transmitting a rotary movement to the house 22 and therewith to a sling 30, which consists of an arched element, which for reasons of equilibrium is completed with a similar symmetrically arranged element 30', both elements together enclosing the cradle 21. The conductor 15 is meant to be led through the shaft 31 into the house 22, from which it is led over a cut-off wheel (not shown in Fig. 1) and over the curved element 30 and via another cut-off wheel (not shown in Fig. 1) through the shaft 35, which it passes together with the conductor 25. The pairtwining is thus caused by the conductor 15 being turned round the conductor 25 at rotation of the sling 30—30'. At its free end the shaft 34, mounted at 32, supports a pulley 26 for transmission of a rotary movement to the cradle 21, which transmission is effected via the cog-wheels 27 and 28, the shaft 29, the cog-wheels 28' and 27' and the shaft 24. It should be observed, that at movement of the sling 30—30' the wheels 28—28' roll on the wheels 27—27', the cradle 21 therefore not being effected by this movement. After the pair-twining the screening can be made in the usual way. If the line is not to be screened, it can suitably be made to pass a screen of suitable length to permit the measuring of the capacitance values.

The reason why the cradles 11 and 21 have been arranged, so that a rotary movement could be imparted to them is that, since the electrical field of a conductor is concentrated nearest to the conductor, the capacitance of the conductor to the surroundings can be increased by a certain determined quantity of insulating material being applied more concentratedly round the conductor, and the capacitance can be reduced, respectively, by the same quantity of insulating material being more spread out when applied round the conductor, thus, when manufacturing a line with a conductor, the capacitance of which is to have a certain determined value, a supply-reel 2 with insulated conductor is inserted in the cradle 21 and said capacitance is measured in a measuring means, which the conductor has to pass, the cradle 21 thereby being imparted a rotary movement in dependence on the control results from said measuring means. If the capacitance is too small, the cradle 21 is then turned in such a manner, that the spirally applied insulating material is twined closer around the conductor; if, on the other hand, the capacitance is too great, the cradle is turned in the opposite direction. When manufacturing a line with two conductors and both the conductors are to have the same capacitance, supply-reels 1 and 2 with insulated conductors are inserted in the cradles 11 and 21 and said capacitances are measured in a measuring means, which the conductors have to pass jointly, the cradles 11 and 21 thereby being imparted rotary movements in dependence on the control results from said measuring means. If a control result proves, that a conductor has for example too small a capacitance, it is thus possible to increase said capacitance by imparting to the pertaining cradle a rotary movement in a determined direction. A still better result is obtained by simultaneously imparting to the other cradle a rotary movement in the opposite direction. In this way the capacitance is balanced more quickly and smoothly. When manufacturing a line with two conductors and both conductors together are to have a certain determined capacitance per unit of length, both cradles 11 and 21 are imparted rotary movements in the same direction in dependence on the control results from the measuring means.

The measuring means according to Fig. 2 comprises a source of alternating voltage 201, which feeds a transformer 202, and a series connection consisting of an amplifier 204, a phase-sensitive rectifier 205, a polarized relay 206, an intermediate-relay 207, and a testing means 211, which feeds energy from a source 208 via the intermediate-relay 207 to one of two motors 214 and 215 actuating the same shaft 216. The line 15–25, pairtwined in the device according to Fig. 1, is wound on a take-up reel provided with two sliding rings with pertaining sliding contacts. The ends of the two conductors are connected to a sliding ring each, and the pertaining sliding contacts are connected to the ends of a secondary winding in the transformer 202. In Fig. 2 it is assumed, that the lines 15—25 have been provided with a screen 203. As indicated by the dashed lines in the figure the conductor 15 has a certain capacitance to the screen 203, as has the conductor 25, and furthermore there exists a certain capacitance directly between the conductors. The midpoint of the secondary winding and the screen 203 are connected to the amplifier 204, and on the output side of the phase-sensitive rectifier 205 a voltage is obtained in dependence on the possible differences as to magnitude and sign in capacitance between conductor and screen for the two conductors. This voltage causes the polarized relay 206 to be set in one of two possible positions, which in its turn causes energy from the source 208 to be fed to one of the output circuits 209 and 210 of the intermediate-relay 207. In Fig. 2 the energy is supposed to be transmitted to the testing means 211 via the output circuit 209, said testing means scanning the output circuits 209 and 210 at equal time intervals, for example 3 seconds, and transmitting the energy either via 212 to the motor 214 or via 213 to the motor 215 during a short interval, for example 0.5 second. The motor 214 strives to turn the shaft 216 in one direction and the motor 215 strives to turn it in the opposite direction, however, not simultaneously; in this case the energy is thus transmitted from 211 to the motor 214 via 212.

The device according to Fig. 3 for driving the two cradles 11 and 21 comprises a differential valve 301, two oil-motors 305 and 306, and a gear transmission 315. The differential valve 301 has an intake 302 for oil from an oil pump and a piston 305 for distributing the oil to two outlets 303 and 304. The piston 305 is located on a gear rack 306, which is arranged to be operated by a cog-wheel located on the shaft 216. The outlet 303 leads to the oil motor 305, which is arranged to drive a cog-wheel 307 in a differential gear. The outlet 304 leads to the oil motor 306, which is arranged to drive a cog-wheel 308 opposite to the cog-wheel 307. The remaining cog-wheels 309 and 310 of the differential gear located on the same shaft are arranged to drive an outgoing shaft 311, which operates the pulley 16 and therewith the cradle 11 via a pulley 312, and the pulley 26 and therewith the cradle 21 via a switch gear 313 and a pulley 314.

The measuring means according to Fig. 4 comprises the source of alternating voltage 201, which feeds the transformer 202, two resistances 41, each one connected to one of the ends of the secondary winding of the transformer 202, a variable condenser 43, and a series connection comprising an amplifier 204′, an intermediate-relay 207′ and a testing means 211′, which via the intermediate-relay 207′ feeds energy from a source 208′ to one or the other of two motors 214′ and 215′ operating the same shaft 216′. The condenser 43, the input terminals to the amplifier 204′ and the conductors 15 and 25, respectively, in a pairtwined line via sliding rings and sliding contacts are connected to the remaining ends of the resistances 41. The control of the capacitance per unit of length of the manufactured line is effected cyclically. At the beginning of the cycle the condenser 43 is completely turned inwards. The voltage after the amplifier 204′ is registered. The condenser 43 is thereafter turned in time to the manufacturing speed. After a certain predetermined length has been manufactured the voltage is tested after the amplifier 204′. Should the voltage then be higher than at the beginning of the cycle, the manufactured line has too low a capacitance, should the voltage be too low the contrary is applicable. The difference of voltage at the beginning and at the end of the cycle may actuate a device similar to that of Fig. 3, the cradles 11 and 21, however, being given the same direction of rotation.

The device according to Fig. 5 as well as the device according to Fig. 3 comprises a first differential gear with cog-wheels 307, 308, 309, 310, two oil motors 305 and 306 arranged to drive the cog-wheels 307 and 308, respectively, a shaft 311 connected with the cog-wheels 309 and 310 and a switch gear 313, but comprises furthermore a second differential gear with cog-wheels 51, 52, 53 and 54, two oil motors 505 and 506 arranged to drive the cog-wheels 52 and 54, a third differential gear with cog-wheels 58, 59, 60 and 61, a gear 57 between the second and the third differential gear, a fourth differential gear with cog-wheels 63, 64, 65 and 66, and a gear 56 between the second and the fourth differential gear. The oil motors 305 and 306 are fed with driving power via a differential valve 301 in dependence on the measuring means according to Fig. 2. The shaft 311 is connected with a shaft connecting the cog-wheels 58 and 60 in the third differential gear, which cog-wheels are placed opposite each other. The cog-wheel 61 is via the gear 57 connected with the interconnected opposed cog-wheels 51 and 53 in the second differential gear, and the remaining cog-wheel 59 in the third differential gear is arranged to drive an outgoing shaft 62, which via the pulley 312 drives the pulley 16 and therewith the cradle 11. The oil motors 505 and 506 are fed with driving power from a second differential valve 301 in dependence on the measuring means according to Fig. 4. The interconnected opposed cog-wheels 51 and 53 actuate a shaft 55, the ends of which support cog-wheels in the gears 56 and 57. The gear 56 drives the cog-wheel 64 in the fourth differential gear. The interconnected, opposed cog-wheels 63 and 65 are connected with the shaft 311 over the gear 313. The cog-wheel 66, located opposite the cog-wheel 64, is arranged to drive an outgoing shaft 67, which via the pulley 314 drives the pulley 26 and therewith the cradle 21.

The device according to Fig. 5 thus makes it possible to impart to the cradles 11 and 21 a combined rotary movement, one component of which originates in an individual difference of capacitance for the conductors and the other and remaining component of which originates in a divergence from a certain determined value of the mutual capacitance per unit of length. The first mentioned component actuates the cradles or the supply means in different directions, while the last mentioned component actuates the supply means in the same direction.

It is obvious, that many other embodiments may be possible without the scope of the invention being departed from. Furthermore, it is evident, that the device according to the invention may be used for lines, the insulation of which is not spirally applied all the way through. Thus, it may for example be used for a line with the insulation porously applied, an auxiliary coil of insulating or conductive material with sufficient hardiness being applied over said insulation. In the embodiments described in the preceding the electrically insulated line is supposed to consist of two conductors, but there is nothing in point of principle which prevents the device from being modified for controlling and adjusting the capacitive non-symmetries of an electrically insulated line, said line consisting of several electrically insulated conductors. The device has then to be provided with a corresponding number of supply means, and the measuring means has to be equipped either with several measuring systems, one for each conductor, or with one measuring system cyclically connected to the different conductors. For controlling and adjusting the capacitance per unit of length of an electrically insulated line consisting of several electrically insulated conductors, the device must be provided with a corresponding number of supply means and the measuring means equipped either with several measuring systems, one for each pair of conductors, or with one measuring system cyclically connected to the different conductors.

I claim:

1. A device for controlling and adjusting the capacitance of an electrically insulated conductor, on which an insulating material is spirally applied, characterized by a rotatable supply means, arranged so as to be able to rotate round a shaft with the same direction as the direction, which an electrically insulated conductor coming from the supply means has when leaving this supply means, and by a measuring means, which the electrically insulated conductor coming from the supply means has to pass for control of its capacitance, the rotatable supply means being arranged to rotate in dependence on the control results from said measuring means.

2. A device according to claim 1 for controlling and adjusting the capacitive non-symmetry of an electrically insulated line, said line consisting of two or more electrically insulated conductors, each of which has a material spirally applied, characterized by rotatable supply means, each of which is arranged to rotate round a shaft with the same direction as the direction which an electrically insulated conductor coming from the supply means has when leaving said supply means, the said electrically insulated conductors being meant to pass the said measuring means jointly for control of a possible difference of capacitance between conductor and earth in the different conductors, the rotatable supply means being furthermore, with regard to the direction of winding of the spirally applied material of a conductor, arranged to rotate in dependence on the control results from the said measuring means.

3. A device according to claim 2 for controlling and adjusting the capacitive non-symmetry of an electrically insulated line consisting of two electrically insulated conductors, characterized by two rotatable supply means being arranged to rotate in the opposite directions to each other and in dependence on the control results from the said measuring means.

4. A device according to claim 1 for controlling and adjusting the capacitance per unit of length of an electrically insulated line consisting of two or more electrically insulated conductors, each of which has a material spirally applied, characterized by rotatable supply means, each of which is arranged to rotate round a shaft with the same direction as the direction of an electrically insulated conductor when it leaves said supply means, said electrically insulated conductors being meant to pass said measuring means jointly for control of the magnitude of the capacitance between the conductors, the rotatable supply means being furthermore, with regard to the direction of winding of the spirally applied material of a conductor, arranged to rotate in dependence on the control results of said measuring means.

5. A device according to claim 4 for controlling and adjusting the capacitance per unit of length of an electrically insulated line consisting of two electrically insulated conductors, characterized by two rotatable supply means being arranged to rotate in the same direction in relation to each other and in dependence on the control results from said measuring means.

6. A device according to claim 5, characterized by a differential valve being, in dependence on the control results from said measuring means, arranged to distribute driving power between two motors, each of which is arranged to drive a cog-wheel in a differential gear, said cog-wheels lying opposite each other, the differential gear in its turn being arranged to drive said supply means.

7. A device according to claim 6, characterized by two differential valves, one of which is, in dependence on the control results from a first measuring means, arranged to distribute driving power between two motors, each of which is arranged to drive a cog-wheel in a differential gear, said cog-wheels lying opposite each other, and the other valve being, in dependence on the control results from a second measuring means, arranged to distribute driving power between two further motors, each of which is arranged to drive a cog-wheel in a second differential gear, said cog-wheels lying opposite each other, the first mentioned differential gear being arranged to drive a first cog-wheel in each one of two further differential gears, the second differential gear being arranged to drive a cog-wheel located close to the first mentioned cog-wheel in each one of the two mentioned additional differential gears, and the rotatable supply means being arranged so as to be driven by a cog-wheel each, said cog-wheels being located between the first mentioned intermediate cog-wheels.

References Cited in the file of this patent

UNITED STATES PATENTS

| | | |
|---|---|---|
| 443,491 | Ball | Dec. 30, 1890 |
| 2,334,880 | Marlow | Nov. 23, 1943 |